(12) United States Patent
Tamai

(10) Patent No.: US 10,707,519 B2
(45) Date of Patent: Jul. 7, 2020

(54) LITHIUM ION SECONDARY BATTERY

(71) Applicant: NEC Corporation, Tokyo (JP)

(72) Inventor: Suguru Tamai, Tokyo (JP)

(73) Assignee: NEC CORPORATION, Minato-ku, Tokyo (JP)

(*) Notice: Subject to any disclaimer, the term of this patent is extended or adjusted under 35 U.S.C. 154(b) by 125 days.

(21) Appl. No.: 15/778,667

(22) PCT Filed: Nov. 29, 2016

(86) PCT No.: PCT/JP2016/085398
§ 371 (c)(1),
(2) Date: May 24, 2018

(87) PCT Pub. No.: WO2017/094719
PCT Pub. Date: Jun. 8, 2017

(65) Prior Publication Data
US 2018/0351203 A1 Dec. 6, 2018

(30) Foreign Application Priority Data
Nov. 30, 2015 (JP) .................................. 2015-233583

(51) Int. Cl.
*H01M 4/38* (2006.01)
*H01M 4/505* (2010.01)
(Continued)

(52) U.S. Cl.
CPC ......... *H01M 10/0525* (2013.01); *H01M 2/26* (2013.01); *H01M 4/134* (2013.01);
(Continued)

(58) Field of Classification Search
CPC .......... H01M 4/38; H01M 4/505; H01M 4/62; H01M 2/26; H01M 10/0525
See application file for complete search history.

(56) References Cited

U.S. PATENT DOCUMENTS 6,436,573 B1 8/2002 Goto et al.
2009/0053606 A1 2/2009 Kim et al.
(Continued)

FOREIGN PATENT DOCUMENTS

JP 08-203499 A 8/1996
JP 11-067215 A 3/1999
(Continued)

OTHER PUBLICATIONS

International Search Report of PCT/JP2016/085398 dated Feb. 28, 2017.
(Continued)

*Primary Examiner* — Kenneth J Douyette
(74) *Attorney, Agent, or Firm* — Sughrue Mion, PLLC

(57) ABSTRACT

Provided is a lithium ion secondary battery that has improved cycle characteristics and employs a silicon material as a negative electrode active material. The lithium ion secondary battery according to the present invention comprises a negative electrode comprising at least a copolymer and a material comprising silicon as a constituent element, wherein the copolymer comprises a monomer unit based on an ethylenically unsaturated carboxylic acid alkali metal salt and a monomer unit based on an aromatic vinyl and the copolymer comprises an alkali metal constituting the alkali metal salt in an amount of 1000 mass ppm or more.

12 Claims, 1 Drawing Sheet

(51) Int. Cl.
  *H01M 4/525* (2010.01)
  *H01M 4/62* (2006.01)
  *H01M 10/0525* (2010.01)
  *H01M 4/134* (2010.01)
  *H01M 4/485* (2010.01)
  *H01M 10/058* (2010.01)
  *H01M 2/26* (2006.01)
  *H01M 10/052* (2010.01)
  *H01M 4/02* (2006.01)

(52) U.S. Cl.
  CPC ........... *H01M 4/386* (2013.01); *H01M 4/485* (2013.01); *H01M 4/505* (2013.01); *H01M 4/525* (2013.01); *H01M 4/622* (2013.01); *H01M 4/623* (2013.01); *H01M 10/058* (2013.01); *H01M 4/625* (2013.01); *H01M 10/052* (2013.01); *H01M 2004/027* (2013.01); *H01M 2004/028* (2013.01); *H01M 2220/20* (2013.01)

(56) References Cited

U.S. PATENT DOCUMENTS

| | | |
|---|---|---|
| 2009/0061325 A1 | 3/2009 | Odani et al. |
| 2014/0087250 A1* | 3/2014 | Coowar ............... H01M 4/134 429/211 |
| 2015/0132643 A1 | 5/2015 | Sasaki |
| 2015/0303456 A1 | 10/2015 | Yoo et al. |
| 2016/0190552 A1 | 6/2016 | Murata et al. |
| 2016/0351947 A1 | 12/2016 | Kamo et al. |

FOREIGN PATENT DOCUMENTS

| | | |
|---|---|---|
| JP | 11-238505 A | 8/1999 |
| JP | 2007-242405 A | 9/2007 |
| JP | 2007-273355 A | 10/2007 |
| JP | 2010-146871 A | 7/2010 |
| JP | 2011-086503 A | 4/2011 |
| JP | 2013-008586 A | 1/2013 |
| JP | 2014-164871 A | 9/2014 |
| JP | 2015-191876 A | 11/2015 |
| JP | 2016-152077 A | 8/2016 |
| WO | 2006/075446 A1 | 7/2006 |
| WO | 2013/161786 A1 | 10/2013 |
| WO | 2014/003077 A1 | 1/2014 |
| WO | 2014/024823 A1 | 2/2014 |
| WO | 2015/019994 A1 | 2/2015 |
| WO | 2015/118846 A1 | 8/2015 |
| WO | 2015/122498 A1 | 8/2015 |

OTHER PUBLICATIONS

Komaba et al., "Higher Energy and Safety of Lithium-Ion Batteries with Ionic Liquid Electrolyte", Proceedings of SPIE, 2010, vol. 7683, pp. 76830E-1 to 76830E-7 (total 7 pages).
Communication dated May 31, 2019 from European Patent Office in counterpart EP Application No. 16870649.7.

* cited by examiner

US 10,707,519 B2

LITHIUM ION SECONDARY BATTERY

CROSS REFERENCE TO RELATED APPLICATIONS

This application is a National Stage of International Application No. PCT/JP2016/085398 filed Nov. 29, 2016, claiming priority based on Japanese Patent Application No. 2015-233583 filed Nov. 30, 2015, the disclosure of which is incorporated herein in its entirety by reference.

TECHNICAL FIELD

The present invention relates to a lithium ion secondary battery, a vehicle using a lithium ion secondary battery, and a method for manufacturing a lithium ion secondary battery.

BACKGROUND ART

Lithium ion secondary batteries have advantages such as high energy density, small self-discharge, excellent long-term reliability and the like, and therefore they have been put into practical use in notebook-type personal computers and mobile phones. More recently, the development of the high performance lithium ion secondary battery excellent in cycle characteristics and further improved in capacity and energy density is demanded due to, in addition to the trend of high functionality of electronic equipment, the expansion of market of motor driven vehicles such as electric vehicles and hybrid vehicles and the acceleration of the development of domestic and industrial power storage systems.

Attention has been drawn to metallic active materials such as silicon, tin and alloys and metal oxides thereof as a negative electrode active material which provides a high capacity lithium ion secondary battery. These metallic negative electrode active materials provide a high capacity, but the expansion and contraction of the active materials are large when lithium ions are absorbed and released. For this reason, as the negative electrode binder containing such a metal-based negative electrode active material having a large expansion and contraction during charge and discharge, it is preferable to select one having a strong binding force capable of withstanding the volume change of the active material.

Patent Document 1 discloses that polyacrylic acid is good as a binder used for a negative electrode containing an active material, such as silicon, tin, or the like, having a large volume change during charge and discharge. This is because the polyacrylic acid has a large number of carboxyl groups as a functional group, providing strong binding force, and is chemically stable. Furthermore, Patent Document 1 discloses that an ethylene-acrylic acid copolymer can be used as a polyacrylic acid binder to improve the flexibility of the polyacrylic acid and to suppress destruction of the binding structure of the active materials due to the expansion and contraction. This suppression of the destruction of the binding structure of the active materials improves the charge and discharge cycle characteristics of the lithium ion secondary battery.

CITATION LIST

Patent Document

Patent Document 1: WO2006/075446

SUMMARY OF INVENTION

Technical Problem

However, even when the above ethylene-acrylic acid copolymer is used as a binder in the negative electrode comprising silicon, the capacity retention rate decreases by repeating charge and discharge, and further improvement has been still needed. Also, in order to improve the energy density of the battery, a binder exhibiting sufficient strength with a smaller amount is desired. An object of the present invention is to provide a lithium ion secondary battery using a silicon material as a negative electrode active material, which is improved in the above problem of the insufficient cycle characteristics by using a polyacrylic acid binder having a higher binding performance.

Solution to Problem

The lithium ion secondary battery according to the present invention comprises a negative electrode comprising at least a copolymer and a material comprising silicon as a constituent element, wherein the copolymer comprises a monomer unit based on an ethylenically unsaturated carboxylic acid alkali metal salt and a monomer unit based on an aromatic vinyl and the copolymer comprises an alkali metal constituting the alkali metal salt in an amount of 1000 mass ppm or more.

Advantageous Effect of Invention

According to the present invention, it is possible to improve the cycle characteristics of the lithium ion secondary battery using a material comprising silicon as a constituent element as a negative electrode active material.

DESCRIPTION OF EMBODIMENTS

Figure 1:
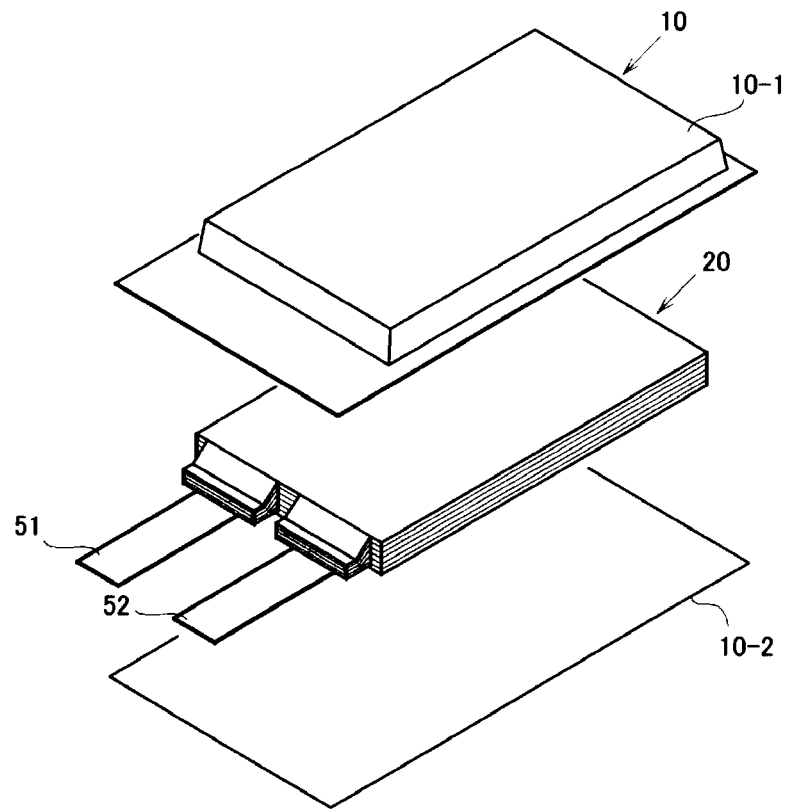
FIG. 1 is an exploded perspective view showing a basic structure of a film package battery.

Each constituent of the lithium ion secondary battery of the present invention will be described below.

<Negative Electrode>

The lithium ion secondary battery of the present invention comprises a binder comprising copolymer and a negative electrode active material comprising a material comprising silicon as a constituent element in the negative electrode. The copolymer comprises a monomer unit based on a ethylenically unsaturated carboxylic acid and at least a part of the carboxylic acids are alkali metal salts. For this reason, the term "carboxylic acid" used hereinafter with regard to copolymers means not only a carboxylic acid but also a carboxylic acid alkali metal salt unless otherwise specified.

The copolymer comprises a monomer unit based on an ethylenically unsaturated carboxylic acid and a monomer unit based on an aromatic vinyl.

Examples of the ethylenically unsaturated carboxylic acid include acrylic acid, methacrylic acid, crotonic acid, maleic acid, fumaric acid, itaconic acid, and alkali metal salts thereof, and one or two or more thereof can be used.

Examples of the aromatic vinyl include styrene, α-methylstyrene, vinyltoluene, divinylbenzene and the like, and one or two or more thereof can be used. By the copolymer comprising the monomer unit based on an aromatic vinyl, the peeling strength between the electrode mixture layer and the current collector can be improved.

In the copolymer, the ratio of the total number of the monomer units based on an aromatic vinyl to the total number of monomer units based on an ethylenically unsaturated carboxylic acid is not particularly limited but is preferably 0.1% or more.

The copolymer may have other monomer units in addition to the monomer unit based on the ethylenically unsaturated carboxylic acid and the monomer unit based on the aromatic vinyl. Examples of other monomer units include monomer units based on an ethylenically unsaturated carboxylic acid derivative such as an ethylenically unsaturated carboxylic acid ester or a compound such as acrylonitrile or a conjugated diene.

At least a part of the carboxylic acids of the monomer units based on the ethylenically unsaturated carboxylic acid are alkali metal salts. Examples of the alkali metal salt include Li, Na, K and the like. The alkali metal forming this alkali metal salt is preferably present in the copolymer in an amount of 1000 mass ppm or more, more preferably 10,000 mass ppm or more, most preferably 50,000 mass ppm or more of the copolymer. The alkali metal is preferably present in the copolymer in an amount equal to or less than the substance amount of the carboxylic acid contained in the copolymer. The alkali metal is preferably present in the copolymer in an amount of 35% by weight or less and more preferably 25% by weight or less, of the copolymer. The presence of the carboxylic acid alkali metal salt in the copolymer makes it possible to improve the produced electrode in the binding property between the active materials and the peel strength between the electrode mixture layer and the current collector. In the lithium ion secondary battery of the present invention, the material comprising silicon as a constituent element is used as a negative electrode active material. Materials containing silicon as a constituent element usually have hydroxyl groups at the terminal and the like. It is presumed that this hydroxyl group and the carboxylic acid alkali metal salt interact to form a bond and the function of the binder is enhanced. For this reason, breakage of the binding structure between the active material particles due to the expansion and shrinkage can be suppressed and the cycle characteristics of the battery can be improved.

The copolymer can be used in combination with another binder. For example, polyvinylidene fluoride, vinylidene fluoride-hexafluoropropylene copolymer, vinylidene fluoride-tetrafluoroethylene copolymer, polytetrafluoroethylene, polypropylene, polyethylene, polyimide, polyamide imide, and the like can be used. In addition to the above, styrene butadiene rubber (SBR) and the like can be used. These can be used in combination with a thickener such as carboxymethyl cellulose (CMC).

The material comprising silicon as a constituent element (hereinafter also referred to as a silicon material) is used in at least a part of the negative electrode active materials. Examples of the silicon material include metal silicon, alloys comprising silicon, silicon oxides denoted by the composition formula, $SiO_x$ ($0<x\leq2$) and the like. These silicon materials can be used in powder form.

When the particle size of the silicon material reduces, the volume change per one particle during the expansion and contraction reduces, so that the stress occurring at that time also becomes small. As a result, it is possible to reduce cracks in the silicon material particles themselves and electrode breakdown in the vicinity of the silicon material particles. In addition, since the particle size is small, the surface area increases and the diffusion distance of Li from a particle surface to a deep portion shortens, so the resistance decreases. From the above, it is preferable that the silicon material particles are small. On the other hand, when the particle size of the silicon material is small, the peeling strength becomes low, and therefore, in the case of conventional binders, it is necessary to increase the amount to be added. For this reason, the resistance of the binder increases, leading disadvantageous for improving the energy density, which is a purpose of adding the silicon material. However, the polyacrylic acid binder used in the present invention can obtain high strength in a small amount and can maintain the peel strength without changing the addition amount even if the particle size is reduced. That is, in the present invention, the cycle characteristics of the battery can be further improved by decreasing the particle size of the silicon material without increasing the addition amount of the binder. Therefore, the 50% particle size (median diameter) D50 of the silicon material powder is preferably 2.0 μm or less, more preferably 1.5 μm or less, and most preferably 1.0 μm or less. In addition, the 50% particle diameter (median diameter) D50 of the silicon material powder is preferably 1 nm or more. The 50% particle size is the median value of a particle size distribution on a volumetric basis. The particle size distribution on a volumetric basis can be measured by a laser diffraction type particle size distribution measuring apparatus.

In some cases, the particle surface of the silicon material is coated with carbon or the like to be used as an active material. However, in the present invention, the silicon material is preferably exposed from at least a part of the surface, and more preferably over the entire surface of the material for use. That is, it is preferable to use the silicon material without coating treatment. This is done to make the carboxylic acid alkali metal salt contained in the copolymer and the hydroxyl group present in the silicon material interact with each other to enhance the binding property between the binder and the active material in the obtained electrode mixture layer.

The silicon material may be used in combine with other active materials. Especially, the silicon material is preferably used together with carbon. The carbon can alleviate the effect of the expansion and contraction of the silicon material to improve the cycle characteristics of the battery. Examples of the carbon include graphite, amorphous carbon, graphene, diamond-like carbon, carbon nanotube, and composites thereof. Here, highly crystalline graphite is highly electroconductive, and has excellent adhesion to a negative electrode current collector composed of a metal such as copper as well as voltage flatness. On the other hand, low-crystallinity amorphous carbon shows relatively small volume expansion, is thus highly effective in lessening the volume expansion of the entire negative electrode, and is unlikely to undergo degradation resulting from non-uniformity such as grain boundaries and defects Other negative electrode active materials, which can be used in combination with the silicon material, also include metals and metal oxides other than silicon. Examples of the metal include Li, Al, Pb, Sn, In, Bi, Ag, Ba, Ca, Hg, Pd, Pt, Te, Zn, La, and alloys of two or more of these. Also, these metals or alloys may contain one or more non-metal elements. Examples of the metal oxide include aluminum oxide, tin oxide, indium oxide, zinc oxide, lithium oxide, and composites of these. Also, for example, 0.1 to 5 mass % of one or two or more elements selected from nitrogen, boron, and sulfur can be added to the metal oxide. In this way, the electroconductivity of the metal oxide can be enhanced.

With respect to the ratio of the copolymer to the total amount of the negative electrode active material, the amount of the copolymer is preferably 0.1 parts by mass or more and more preferably 0.5 parts by mass based on 100 parts by mass of the negative electrode active material from the viewpoint of sufficient binding strength. The amount of the copolymer is preferably 50 parts by mass or less and more preferably 30 parts by mass or less based on 100 parts by mass of the negative electrode active material from the viewpoint of high energy density. The negative electrode active material is a material capable of absorbing and desorbing lithium. Herein, the negative electrode active material does not include materials which do not absorb and desorb lithium, such as binders.

For the negative electrode, a conductive assisting agent may be added for the purpose of lowering the impedance. Examples of the conductive assisting agent include flake-like and fibrous carbon fine particles and the like, for example, carbon black, acetylene black, ketjen black, vapor grown carbon fibers and the like.

As the negative electrode current collector, from the viewpoint of electrochemical stability, aluminum, nickel, copper, silver, and alloys thereof are preferred. As the shape thereof, foil, flat plate, mesh and the like are exemplified.

The negative electrode may be prepared in accordance with a conventional method. In one aspect, the negative electrode can be produced by mixing the negative electrode active material, the copolymer and optionally the conductive assisting agent with a solvent to prepare a slurry, applying it to the negative electrode current collector, and drying. The application can be carried out by a doctor blade method, a die coater method, a CVD method, a sputtering method, or the like.

<Positive Electrode>

The positive electrode active material is not particularly limited as long as it is a material capable of absorbing and desorbing lithium, but from the viewpoint of high energy density, it is preferred to comprise a high capacity compound. Examples of the high capacity compound include lithium nickelate ($LiNiO_2$) and lithium nickel composite oxides in which a part of the Ni of lithium nickelate is replaced by another metal element, and layered lithium nickel composite oxides represented by the following formula (A) are preferred.

$$Li_yNi_{(1-x)}M_xO_2 \quad (A)$$

wherein $0 \leq x < 1$, $0 < y \leq 1.2$, and M is at least one element selected from the group consisting of Co, Al, Mn, Fe, Ti, and B.

From the viewpoint of high energy density, it is preferred that the content of Ni is high, that is, x is less than 0.5, further preferably 0.4 or less in the formula (A). Examples of such compounds include $Li_\alpha Ni_\beta Co_\gamma Mn_\delta O_2$ ($0<\alpha\leq1.2$, preferably $1\leq\alpha\leq1.2$, $\beta+\gamma+\delta=1$, $P\geq0.7$, and $\gamma\leq0.2$) and $Li_\alpha Ni_\beta Co_\gamma Al_\delta O_2$ ($0<\alpha\leq1.2$, preferably $1\leq\alpha\leq1.2$, $\beta+\gamma+\delta=1$, $\beta\geq0.6$, preferably $\beta\geq0.7$, and $\gamma\leq0.2$) and particularly include $LiNi_\beta Co_\gamma Mn_\delta O_2$ ($0.75\leq\beta\leq0.85$, $0.05\leq\gamma\leq0.15$, and $0.10\leq\delta\leq0.20$). More specifically, for example, $LiNi_{0.8}Co_{0.05}Mn_{0.15}O_2$, $LiNi_{0.8}Co_{0.1}Mn_{0.1}O_2$, $LiNi_{0.8}Co_{0.15}Al_{0.05}O_2$, and $LiNi_{0.8}Co_{0.1}Al_{0.1}O_2$ may be preferably used.

From the viewpoint of thermal stability, it is also preferred that the content of Ni does not exceed 0.5, that is, x is 0.5 or more in the formula (A). In addition, it is also preferred that particular transition metals do not exceed half. Examples of such compounds include $Li_\alpha Ni_\beta Co_\gamma Mn_\delta O_2$ ($0<\alpha\leq1.2$, preferably $1\leq\alpha\leq1.2$, $\beta+\gamma+\delta=1$, $0.2\leq\beta\leq0.5$, $0.1\leq\gamma\leq0.4$, and $0.1\leq\delta\leq0.4$). More specific examples may include $LiNi_{0.4}Co_{0.3}Mn_{0.3}O_2$ (abbreviated as NCM433), $LiNi_{1/3}Co_{1/3}Mn_{1/3}O_2$, $LiNi_{0.5}Co_{0.2}Mn_{0.3}O_2$ (abbreviated as NCM523), and $LiNi_{0.5}Co_{0.3}Mn_{0.2}O_2$ (abbreviated as NCM532) (also including those in which the content of each transition metal fluctuates by about 10% in these compounds).

In addition, two or more compounds represented by the formula (A) may be mixed and used, and, for example, it is also preferred that NCM532 or NCM523 and NCM433 are mixed in the range of 9:1 to 1:9 (as a typical example, 2:1) and used. Further, by mixing a material in which the content of Ni is high (x is 0.4 or less in the formula (A)) and a material in which the content of Ni does not exceed 0.5 (x is 0.5 or more, for example, NCM433), a battery having high capacity and high thermal stability can also be formed.

Examples of the positive electrode active materials other than the above include lithium manganate having a layered structure or a spinel structure such as $LiMnO_2$, $Li_xMn_2O_4$ ($0<x<2$), $Li_2MnO_3$, and $Li_xMn_{1.5}Ni_{0.5}O_4$ ($0<x<2$); $LiCoO_2$ or materials in which a part of the transition metal in this material is replaced by other metal(s); materials in which Li is excessive as compared with the stoichiometric composition in these lithium transition metal oxides; materials having olivine structure such as $LiFePO_4$, and the like. In addition, materials in which a part of elements in these metal oxides is substituted by Al, Fe, P, Ti, Si, Pb, Sn, In, Bi, Ag, Ba, Ca, Hg, Pd, Pt, Te, Zn, La are also usable. The positive electrode active materials described above may be used alone or in combination of two or more.

Examples of the positive electrode binder include polyvinylidene fluoride, vinylidene fluoride-hexafluoropropylene copolymer, vinylidene fluoride-tetrafluoroethylene copolymer, polytetrafluoroethylene, polypropylene, polyethylene, polyimide, polyamideimide and the like. In addition to the above, styrene butadiene rubber (SBR) and the like can be used. When an aqueous binder such as an SBR emulsion is used, a thickener such as carboxymethyl cellulose (CMC) can also be used. Among them, polyvinylidene fluoride or polytetrafluoroethylene is preferable from the viewpoint of versatility and low cost, and polyvinylidene fluoride is more preferable. The above positive electrode binders may be mixed and used. The amount of the positive electrode binder is preferably 2 to 10 parts by mass based on 100 parts by mass of the positive electrode active material, from the viewpoint of the binding strength and energy density that are in a trade-off relation with each other.

For the coating layer containing the positive electrode active material, a conductive assisting agent may be added for the purpose of lowering the impedance. Examples of the conductive assisting agent include, flake-like and fibrous carbon fine particles and the like, for example, graphite, carbon black, acetylene black, vapor grown carbon fibers and the like.

As the positive electrode current collector, from the view point of electrochemical stability, aluminum, nickel, copper, silver, and alloys thereof are preferred. As the shape thereof, foil, flat plate, mesh and the like are exemplified. In particular, a current collector using aluminum, an aluminum alloy, or iron-nickel-chromium-molybdenum based stainless steel is preferable.

The positive electrode may be prepared by forming a positive electrode mixture layer comprising the positive electrode active material and the positive electrode binder.

Examples of a method for forming the positive electrode mixture layer include a doctor blade method, a die coater method, a CVD method, a sputtering method, and the like. It is also possible that, after forming the positive electrode mixture layer in advance, a thin film of aluminum, nickel or an alloy thereof may be formed by a method such as vapor deposition, sputtering or the like to obtain a positive electrode current collector.

<Electrolyte Solution>

The electrolytic solution of the lithium ion secondary battery according to the present embodiment is not particularly limited but is preferably a non-aqueous electrolyte solution comprising a non-aqueous solvent and a supporting salt, which are stable at the operating potential of the battery.

Examples of the non-aqueous solvent include aprotic organic solvents, for examples, cyclic carbonates such as propylene carbonate (PC), ethylene carbonate (EC) and butylene carbonate (BC); open-chain carbonates such as dimethyl carbonate (DMC), diethyl carbonate (DEC), ethyl methyl carbonate (EMC) and dipropyl carbonate (DPC); aliphatic carboxylic acid esters such as propylene carbonate derivatives, methyl formate, methyl acetate and ethyl propionate; ethers such as diethyl ether and ethyl propyl ether; phosphoric acid esters such as trimethyl phosphate, triethyl phosphate, tripropyl phosphate, trioctyl phosphate and triphenyl phosphate; and fluorinated aprotic organic solvents obtainable by substituting at least a part of the hydrogen atoms of these compounds with fluorine atom(s), and the like.

Among them, cyclic or open-chain carbonate(s) such as ethylene carbonate (EC), propylene carbonate (PC), butylene carbonate (BC), dimethyl carbonate (DMC), diethyl carbonate (DEC), ethyl methyl carbonate (MEC), dipropyl carbonate (DPC) and the like is preferably contained.

The non-aqueous solvent may be used alone, or in combination of two or more.

Examples of the supporting salt include $LiPF_6$, $LiAsF_6$, $LiAlCl_4$, $LiClO_4$, $LiBF_4$, $LiSbF_6$, $LiCF_3SO_3$, $LiC_4F_9SO_3$, $LiC(CF_3SO_2)_3$, $LiN(CF_3SO_2)_2$ and the like. Supporting salts may be used alone or in combination of two or more. From the viewpoint of cost reduction, $LiPF_6$ is preferable.

The electrolyte solution may further comprise an additive. The additive is not particularly limited, and examples thereof include halogenated cyclic carbonates, unsaturated cyclic carbonates, cyclic or open-chain disulfonic acid esters, and the like. These compounds can improve battery properties such as cycle characteristics. This is presumably because these additives decompose during charge and discharge of the lithium ion secondary battery to form a film on the surface of the electrode active material to inhibit decomposition of the electrolyte solution and supporting salt.

<Separator>

The separator may be of any type as long as it suppresses electron conduction between the positive electrode and the negative electrode, does not inhibit the permeation of charged substances, and has durability against the electrolyte solution. Specific examples of the material include polyolefins such as polypropylene and polyethylene, cellulose, polyethylene terephthalate, polyimide, polyvinylidene fluoride, and aromatic polyamides (aramid) such as polymetaphenylene isophthalamide, polyparaphenylene terephthalamide and cop olyparaphenylene 3,4'-oxydiphenylene terephthalamide, and the like. These can be used as porous films, woven fabrics, nonwoven fabrics or the like.

<Insulation Layer>

An insulation layer may be formed on at least one surface of the positive electrode, the negative electrode and the separator. Examples of a method for forming the insulation layer include a doctor blade method, a dip coating method, a die coater method, a CVD method, a sputtering method, and the like. The insulation layer may be formed at the same time as forming the positive electrode, negative electrode or separator. Materials constituting the insulation layer include a mixture of aluminum oxide, barium titanate or the like and SBR or PVDF.

<Structure of Secondary Battery>

Figure 2:
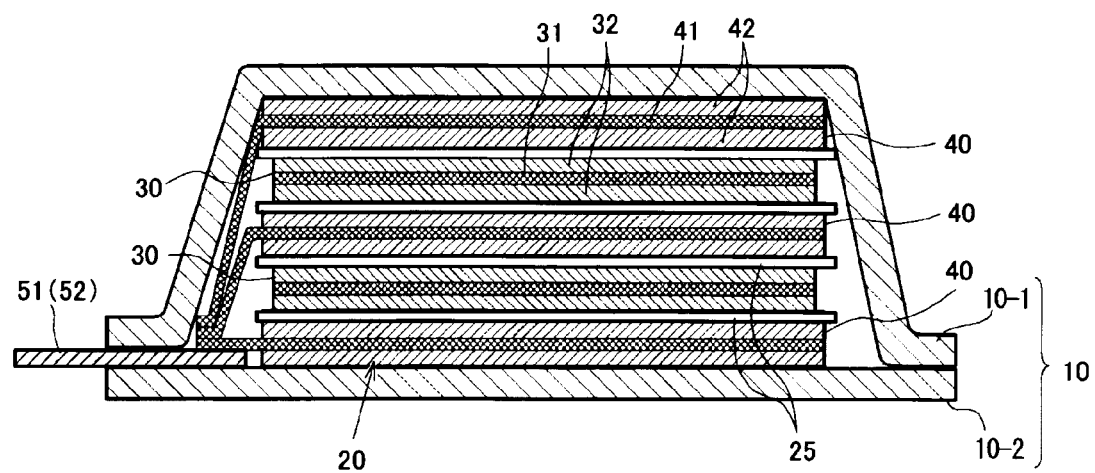
FIG. 2 is a cross-sectional view schematically showing a cross section of the battery of FIG. 1.

The lithium ion secondary battery according to the present embodiment may be, for example, a secondary battery having a structure as shown in FIGS. 1 and 2. This lithium ion secondary battery comprises a battery element 20, a film package 10 housing the battery element 20 together with an electrolyte, and a positive electrode tab 51 and a negative electrode tab 52 (hereinafter these are also simply referred to as "electrode tabs").

In the battery element 20, a plurality of positive electrodes 30 and a plurality of negative electrodes 40 are alternately stacked with separators 25 sandwiched therebetween as shown in FIG. 2. In the positive electrode 30, an electrode material 32 is applied to both surfaces of a metal foil 31, and also in the negative electrode 40, an electrode material 42 is applied to both surfaces of a metal foil 41 in the same manner. The present invention is not necessarily limited to stacking type batteries and may also be applied to batteries such as a winding type.

As shown in FIGS. 1 and 2, the lithium ion secondary battery according to the present embodiment may have an arrangement in which the electrode tabs are drawn out to one side of the outer package, but the electrode tab may be drawn out to both sides of the outer package. Although detailed illustration is omitted, the metal foils of the positive electrodes and the negative electrodes each have an extended portion in part of the outer periphery. The extended portions of the negative electrode metal foils are brought together into one and connected to the negative electrode tab 52, and the extended portions of the positive electrode metal foils are brought together into one and connected to the positive electrode tab 51 (see FIG. 2). The portion in which the extended portions are brought together into one in the stacking direction in this manner is also referred to as a "current collecting portion" or the like.

The film package 10 is composed of two films 10-1 and 10-2 in this example. The films 10-1 and 10-2 are heat-sealed to each other in the peripheral portion of the battery element 20 and hermetically sealed. In FIG. 1, the positive electrode tab 51 and the negative electrode tab 52 are drawn out in the same direction from one short side of the film package 10 hermetically sealed in this manner.

Of course, the electrode tabs may be drawn out from different two sides respectively. In addition, regarding the arrangement of the films, in FIG. 1 and FIG. 2, an example in which a cup portion is formed in one film 10-1 and a cup portion is not formed in the other film 10-2 is shown, but other than this, an arrangement in which cup portions are formed in both films (not illustrated), an arrangement in which a cup portion is not formed in either film (not illustrated), and the like may also be adopted.

<Method for Manufacturing Lithium Ion Secondary Battery>

The lithium ion secondary battery according to the present embodiment can be manufactured by a conventional method. An example of a method for manufacturing a lithium ion secondary battery will be described taking a stacked laminate type lithium ion secondary battery as an example. First, in the dry air or an inert atmosphere, the positive electrode and the negative electrode are placed to oppose to each other via a separator to form an electrode element. Next, this electrode element is accommodated in an outer package (container), an electrolyte solution is injected, and the electrodes are impregnated with the electrolyte solution. Thereafter, the opening of the outer package is sealed to complete the lithium ion secondary battery.

<Assembled Battery>

A plurality of the lithium ion secondary batteries according to the present embodiment may be combined to form an assembled battery. The assembled battery may be configured by connecting two or more lithium ion secondary batteries according to the present embodiment in series or in parallel or in combination of both. The connection in series and/or parallel makes it possible to adjust the capacitance and voltage freely. The number of lithium ion secondary batteries included in the assembled battery can be set appropriately according to the battery capacity and output.

<Vehicle>

The lithium ion secondary battery or the assembled battery according to the present embodiment can be used in vehicles. Vehicles according to the present embodiment include hybrid vehicles, fuel cell vehicles, electric vehicles (besides four-wheel vehicles (cars, trucks, commercial vehicles such as buses, light automobiles, etc.) two-wheeled vehicle (bike) and tricycle), and the like. The vehicles according to the present embodiment is not limited to automobiles, it may be a variety of power source of other vehicles, such as a moving body like a train.

EXAMPLE

Example 1

(Negative Electrode)

As a negative electrode active material, a graphite and an uncoated metal silicon (Si) having a 50% particle size of 1.0 µm were used and as a negative electrode binder, an aromatic vinyl-ethylenically unsaturated carboxylic acid copolymer comprising more than 1000 mass ppm of Na as a carboxylic acid salt was used. These were respectively weighed at a mass ratio of graphite/Si/binder=90/7/3, and mixed with water. The obtained slurry was applied on a copper foil having a thickness of 10 µm, then dried, and further heat-treated at 100° C. under vacuum to prepare a negative electrode.

(Evaluation of Electrode Peel Strength)

The fabricated negative electrode was cut into a strip shape of 1 cm width and fixed to a fixing base with double-sided adhesive tape. The end of the current collector of the fixed electrode was slightly peeled off from the electrode mixture layer with tweezers and the peeled current collector portion was attached to a tensile tester. Then, the tensile tester was operated, the peeled current collector portion was pulled at a constant speed at an angle of 90° with respect to the fixed base, and the electrode peel strength was measured from the stress at that time.

(Positive Electrode)

As a positive electrode active material, $LiNi_{0.8}Co_{0.15}Al_{0.05}O_2$ was used. This positive electrode active material, carbon black as a conductive agent, and polyvinylidene fluoride as a positive electrode binder were weighed at a mass ratio of 90:5:5. Then, these were mixed with N-methylpyrrolidone to prepare a positive electrode slurry. The positive electrode slurry was applied on an aluminum foil having a thickness of 20 µm, then dried and further pressed to prepare a positive electrode.

(Electrode Stack)

The fabricated three layers of the positive electrodes and four layers of the negative electrodes were stacked alternately via an aramid porous film as a separator. The end portions of the positive electrode current collectors that were not covered with the positive electrode active material and the end portions of the negative electrode current collectors that were not covered with the negative electrode active material were welded individually. Further, to the welding positions, an aluminum positive electrode terminal and a nickel negative electrode terminal were welded respectively, to obtain an electrode stack having a planar stacked structure.

(Electrolyte Solution)

$LiPF_6$ was added as a supporting salt into a solvent prepared by mixing ethylene carbonate (EC) and diethyl carbonate (DEC) at a volume ratio of EC/DEC=30/70 to prepare an electrolyte solution having a supporting salt concentration of 1 mol/L.

(Injection)

The electrode stack was accommodated in an aluminum laminate film as an outer package, and then the electrolyte solution was injected inside the outer package. Thereafter, vacuum impregnation (pressure: 10 kPa (abs)) was performed in a chamber, and the outer package was sealed to obtain a battery.

(Battery Evaluation)

The fabricated battery was subjected to a cycle test as follows. 50 cycles of CC-CV charge (upper limit voltage 4.2 V, current 1C and CV time 1.5 hours) and CC discharge (lower limit voltage 3.0 V and current 1C) were carried out at 45° C. Table 1 shows the capacity retention ratio after the 50 cycles, that is, the ratio of the discharge capacity at the $50^{th}$ cycle to the discharge capacity at the first cycle.

Example 2

The lithium ion secondary battery was fabricated in the same manner as in Example 1 except that the 50% particle size of the uncoated Si was 0.05 µm and the peel strength evaluation of the negative electrode and the battery evaluation were conducted in the same manner.

Example 3

The lithium ion secondary battery was fabricated in the same manner as in Example 1 except that the 50% particle size of the uncoated Si was 0.1 µm and the peel strength evaluation of the negative electrode and the battery evaluation were conducted in the same manner.

Example 4

The lithium ion secondary battery was fabricated in the same manner as in Example 1 except that the 50% particle size of the uncoated Si was 0.5 µm and the peel strength evaluation of the negative electrode and the battery evaluation were conducted in the same manner.

Example 5

The lithium ion secondary battery was fabricated in the same manner as in Example 1 except that the 50% particle size of the uncoated Si was 2.0 µm and the peel strength evaluation of the negative electrode and the battery evaluation were conducted in the same manner.

Example 6

The lithium ion secondary battery was fabricated in the same manner as in Example 1 except that the 50% particle size of the uncoated Si was 3.0 μm and the peel strength evaluation of the negative electrode and the battery evaluation were conducted in the same manner.

Example 7

The lithium ion secondary battery was fabricated in the same manner as in Example 1 except that the 50% particle size of the uncoated Si was 5.0 μm and the peel strength evaluation of the negative electrode and the battery evaluation were conducted in the same manner.

Example 8

A carbon coated Si was used instead of the uncoated Si. The 50% particle size of the carbon coated Si was 1.0 μm. Otherwise, the lithium ion secondary battery was fabricated in the same manner as in Example 1 and the peel strength evaluation of the negative electrode and the battery evaluation were conducted in the same manner.

Comparative Example 1

As a negative electrode binder, an aromatic vinyl-ethylenically unsaturated carboxylic acid copolymer not comprising Na was used. Otherwise in the same manner as in Example 1, the lithium ion secondary battery was fabricated and the peel strength evaluation of the negative electrode and the battery evaluation were conducted.

Comparative Example 2

As a negative electrode binder, a homopolymer of an ethylenically unsaturated carboxylic acid comprising more than 1000 mass ppm of Na as a carboxylic acid salt was used. Otherwise in the same manner as in Example 1, the lithium ion secondary battery was fabricated and the peel strength evaluation of the negative electrode and the battery evaluation were conducted.

Table 1 shows the negative electrode materials and the results of the electrode peel strength and the battery evaluations of Examples 1 to 8 and Comparative examples 1 and 2.

TABLE 1

| | Particle size of Si (μm) | Carbon coating | Binder structure | Na amount in binder (ppm) | Electrode Peel strength (N/m) | Capacity retention ratio at 50th cycle |
|---|---|---|---|---|---|---|
| Example 1 | 1.0 | None | Copolymer | ≥1000 | 26 | 95 |
| Example 2 | 0.05 | None | Copolymer | ≥1000 | 20 | 96 |
| Example 3 | 0.1 | None | Copolymer | ≥1000 | 23 | 96 |
| Example 4 | 0.5 | None | Copolymer | ≥1000 | 26 | 96 |
| Example 5 | 2.0 | None | Copolymer | ≥1000 | 28 | 90 |
| Example 6 | 3.0 | None | Copolymer | ≥1000 | 33 | 85 |
| Example 7 | 5.0 | None | Copolymer | ≥1000 | 35 | 70 |
| Example 8 | 1.0 | Present | Copolymer | ≥1000 | 20 | 90 |
| Comparative example 1 | 1.0 | None | Copolymer | 0 | 10 | 10 |
| Comparative example 2 | 1.0 | None | Homopolymer | ≥1000 | 16 | 85 |

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

INDUSTRIAL APPLICABILITY

The lithium ion secondary battery according to the present invention can be utilized in, for example, all the industrial fields requiring a power supply and the industrial fields pertaining to the transportation, storage and supply of electric energy. Specifically, it can be used in, for example, power supplies for mobile equipment such as cellular phones and notebook personal computers; power supplies for electrically driven vehicles including an electric vehicle, a hybrid vehicle, an electric motorbike and an electric-assisted bike, and moving/transporting media such as trains, satellites and submarines; backup power supplies for UPSs; and electricity storage facilities for storing electric power generated by photovoltaic power generation, wind power generation and the like.

EXPLANATION OF REFERENCE

10 film package
20 battery element
25 separator
30 positive electrode
40 negative electrode

The invention claimed is:

1. A lithium ion secondary battery, comprising,
a negative electrode comprising a binder and a negative electrode active material a material comprising silicon as a constituent element,
wherein the binder is a copolymer of an aromatic vinyl and an ethylenically unsaturated carboxylic acid, and at least part of the ethylenically unsaturated carboxylic acid is an alkali metal salt, and
the copolymer comprises an alkali metal constituting the alkali metal salt in an amount of 1000 mass ppm or more.

2. The lithium ion secondary battery according to claim 1, wherein the material comprising silicon as a constituent element is selected from the group consisting of metal silicon, alloys comprising silicon and silicon oxides.

3. The lithium ion secondary battery according to claim 1, wherein the material comprising silicon as a constituent element is exposed from at least a part of a surface of a particle of the material comprising silicon as a constituent element.

4. The lithium ion secondary battery according to claim 1, wherein a 50% particle size of the material comprising silicon as a constituent element is 2.0 μm or less.

5. The lithium ion secondary battery according to claim 1, wherein the alkali metal is Na.

6. The lithium ion secondary battery according to claim 1, wherein the negative electrode further comprises a carbon.

7. A vehicle comprising the lithium ion secondary battery according to claim 1.

8. A method for manufacturing a lithium ion secondary battery, comprising the steps of:
fabricating the electrode element by stacking a positive electrode and a negative electrode via a separator, and
encapsulating the electrode element and an electrolyte solution into an outer package,
wherein the negative electrode comprises a binder and a negative electrode active material comprising a material comprising silicon as a constituent element,
wherein the binder is a copolymer of an aromatic vinyl and an ethylenically unsaturated carboxylic acid, and at least part of the ethylenically unsaturated carboxylic acid is an alkali metal salt, and
the copolymer comprises an alkali metal constituting the alkali metal salt in an amount of 1000 mass ppm or more.

9. The lithium ion secondary battery according to claim 1, wherein the material comprising silicon as a constituent element is an uncoated metal silicon having a 50% particle size of 0.1 μm to 1.0 μm.

10. The lithium ion secondary battery according to claim 9, wherein the negative electrode active material comprises a graphite.

11. The lithium ion secondary battery according to claim 10, wherein an amount of the binder is 0.5 to 30 parts by mass based on 100 parts by mass of the negative electrode active material.

12. The lithium ion secondary battery according to claim 11, wherein an amount of the binder is 3 to 30 parts by mass based on 100 parts by mass of the negative electrode active material.

* * * * *

UNITED STATES PATENT AND TRADEMARK OFFICE
CERTIFICATE OF CORRECTION

PATENT NO. : 10,707,519 B2
APPLICATION NO. : 15/778667
DATED : July 7, 2020
INVENTOR(S) : Suguru Tamai It is certified that error appears in the above-identified patent and that said Letters Patent is hereby corrected as shown below:

On the Title Page

Page 2, Column 2, item (56), Other Publications, Line 5; After "16870649.7.", insert --¶Communication dated Dec. 2, 2019 from the United States Patent and Trademark Office in application no. 15/779,660.--

In the Specification

Column 5, Description of Embodiments, Line 57; Delete "P≥0.7," and insert --β≥0.7,-- therefor Column 7, Description of Embodiments, Line 62; Delete "cop olyparaphenylene" and insert --copolyparaphenylene-- therefor In the Claims Column 12, Line 33; In Claim 1, delete "comprising," and insert --comprising:-- therefor Signed and Sealed this
Seventeenth Day of November, 2020

Andrei Iancu
*Director of the United States Patent and Trademark Office*